(12) United States Patent
Bianchi et al.

(10) Patent No.: US 10,221,966 B2
(45) Date of Patent: Mar. 5, 2019

(54) PIPELINE ABANDON AND RECOVER METHOD AND SYSTEM USING A ROPE CONNECTED TO THE PIPELINE, AND ADAPTER FOR IMPLEMENTING THE METHOD

(75) Inventors: Stefano Bianchi, Cernusco sul Naviglio (IT); Sergio Bogge, Cascine Vica-Rivoli (IT); Massimo Pulici, Carate Brianza (IT)

(73) Assignee: SAIPEM S.P.A., San Donato Milanese (IT)

( * ) Notice: Subject to any disclaimer, the term of this patent is extended or adjusted under 35 U.S.C. 154(b) by 537 days.

(21) Appl. No.: 14/111,081

(22) PCT Filed: Apr. 16, 2012

(86) PCT No.: PCT/IB2012/051890
§ 371 (c)(1),
(2), (4) Date: Jan. 30, 2014

(87) PCT Pub. No.: WO2012/140631
PCT Pub. Date: Oct. 18, 2012

(65) Prior Publication Data
US 2014/0294511 A1 Oct. 2, 2014

(30) Foreign Application Priority Data
Apr. 15, 2011 (IT) .................. MI2011A0649

(51) Int. Cl.
*F16L 1/23* (2006.01)
*F16L 1/20* (2006.01)
*B65H 51/10* (2006.01)

(52) U.S. Cl.
CPC .............. *F16L 1/23* (2013.01); *B65H 51/105* (2013.01); *F16L 1/207* (2013.01)

(58) Field of Classification Search
CPC ........ F16L 1/235; F16L 1/202; F16L 2101/50
USPC ....................................... 405/168.4
See application file for complete search history.

(56) References Cited

U.S. PATENT DOCUMENTS

| 3,581,506 | A | * | 6/1971 | Howard ................... 405/166 |
| 3,965,713 | A | * | 6/1976 | Horton ..................... 72/146 |
| 4,687,376 | A | * | 8/1987 | Recalde .................. 405/168.3 |
| 4,828,223 | A | * | 5/1989 | Russell et al. ............ 254/265 |

(Continued)

FOREIGN PATENT DOCUMENTS

WO WO 03/074413 9/2003
WO WO 2006/027189 3/2006

OTHER PUBLICATIONS

International Search Report and Written Opinion for International Application No. PCT/IB2012/051890 dated Aug. 6, 2012.

(Continued)

*Primary Examiner* — Tara Mayo-Pinnock
(74) *Attorney, Agent, or Firm* — Neal, Gerber & Eisenberg LLP

(57) ABSTRACT

A pipeline A/R method using a rope connected to the pipeline, the method including winding/unwinding the rope utilizing a hauling machine to exert pull on the rope; adapting a crawler pipeline tensioning device to grip the rope in the crawler tensioning device; and exerting additional pull on a portion of rope between the crawler tensioning device and the pipeline.

8 Claims, 4 Drawing Sheets

(56) References Cited

U.S. PATENT DOCUMENTS

| | | | | |
|---|---|---|---|---|
| 5,044,825 | A | * | 9/1991 | Kaldenbach .................. 405/166 |
| 5,197,716 | A | * | 3/1993 | Zibilich et al. ...... 254/134.3 SC |
| 5,533,834 | A | * | 7/1996 | Recalde ..................... 405/168.3 |
| 5,573,353 | A | * | 11/1996 | Recalde ..................... 405/168.3 |
| 5,655,753 | A | * | 8/1997 | Berges et al. ........ 254/134.3 SC |
| 5,823,712 | A | * | 10/1998 | Kalkman et al. ............. 405/165 |
| 7,226,244 | B1 | | 6/2007 | De Groot et al. |
| 2003/0044234 | A1 | * | 3/2003 | Stockstill ................... 405/154.1 |
| 2003/0044235 | A1 | * | 3/2003 | Stockstill ................... 405/154.1 |
| 2003/0091395 | A1 | * | 5/2003 | Stockstill ................... 405/154.1 |
| 2003/0138297 | A1 | * | 7/2003 | Stockstill ..................... 405/158 |
| 2006/0153644 | A1 | * | 7/2006 | Grinsted ................... 405/224.4 |
| 2012/0177443 | A1 | * | 7/2012 | Baylot et al. .............. 405/168.4 |

OTHER PUBLICATIONS

Notification Concerning Submission, Obtention or Transmittal of Priority Document (Form PCT/IB/304) for International Application No. PCT/IB2012/051890 dated Jul. 10, 2012.
Notification of the Recording of a Change (Form PCT/IB/306) for International Application No. PCT/IB2012/051890 dated Nov. 14, 2012.

* cited by examiner

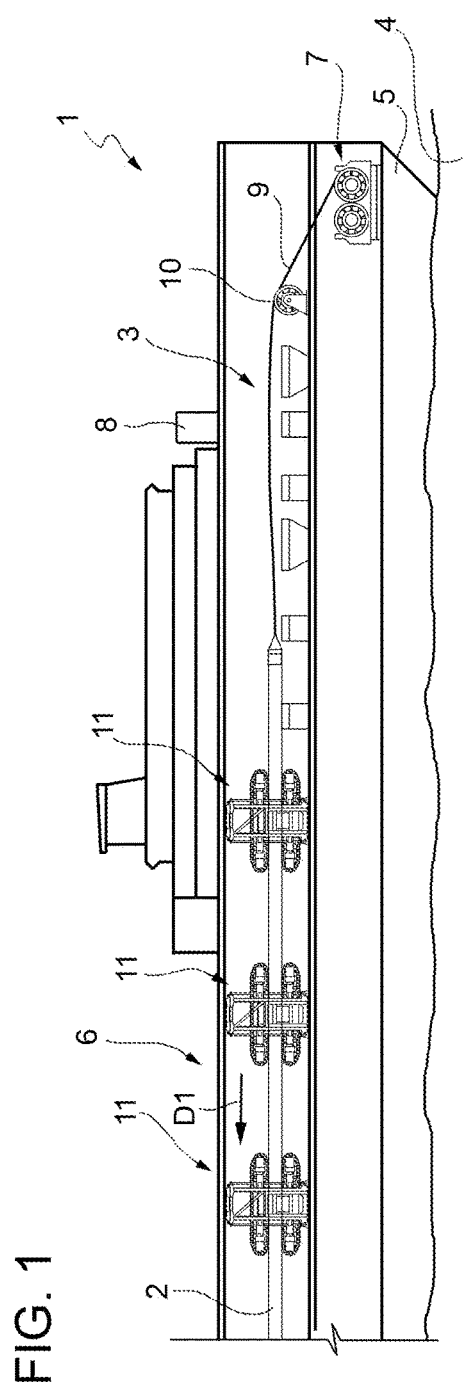
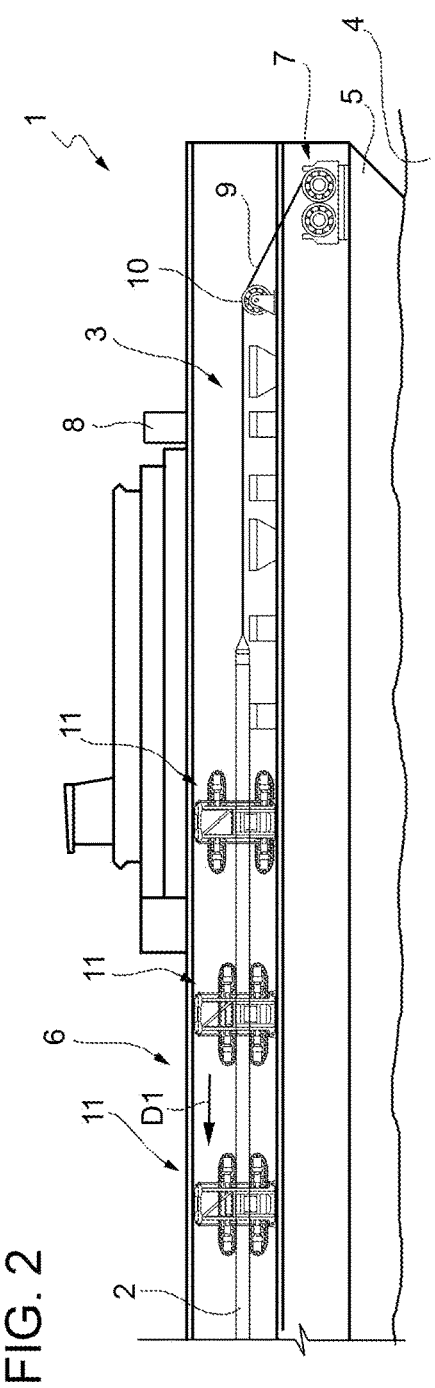

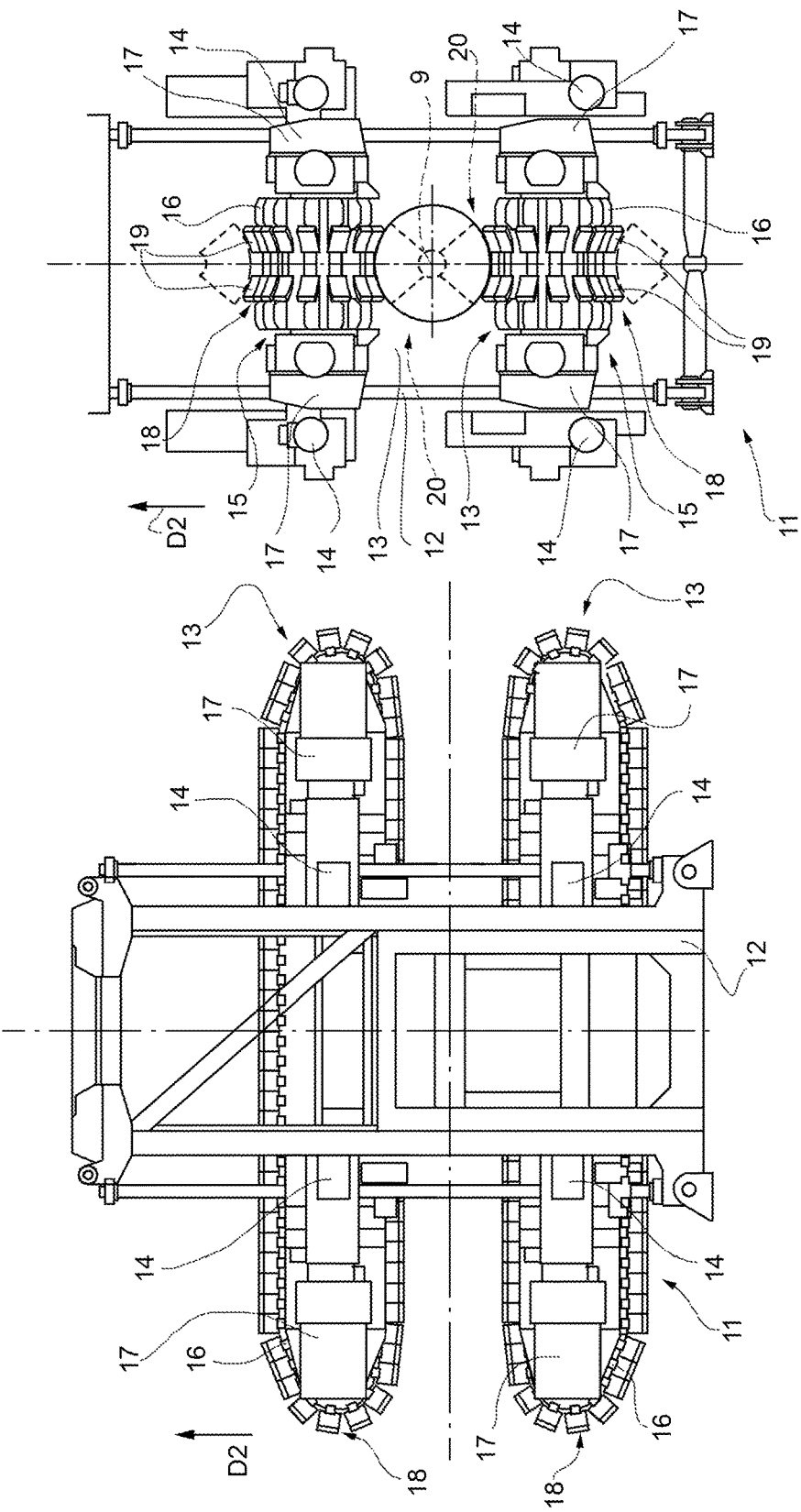

PIPELINE ABANDON AND RECOVER METHOD AND SYSTEM USING A ROPE CONNECTED TO THE PIPELINE, AND ADAPTER FOR IMPLEMENTING THE METHOD

PRIORITY CLAIM

This application is a national stage application of PCT/IB2012/051890, filed on Apr. 16, 2012, which claims the benefit of and priority to Italian Patent Application No. MI2011A 000649, filed on Apr. 15, 2011, the entire contents of which are each incorporated by reference herein.

BACKGROUND

Certain known pipeline laying vessels are normally configured to construct a pipeline on board, and release the pipeline gradually into a body of water. The pipeline is made of pipe sections joined together on an assembly line, and release of the pipeline is controlled by one or more tensioning devices configured to grip the pipeline on opposite sides, selectively move the pipeline forward in a controlled manner, and retain the pipeline in a given position with respect to the laying vessel.

When the pipeline is completed or laying is interrupted by bad weather, the pipeline must be abandoned on the bed of the body of water. And, when the abandoned pipeline is not completed, the pipeline must be recovered on board the laying vessel to continue construction.

In certain instances, the pipeline is abandoned and recovered by connecting the end of the pipeline to a rope connected to a hauling machine, normally a winch, which unwinds/winds the rope to abandon/recover the pipeline. When abandoning the pipeline in the water, the end is first sealed to prevent the pipeline from flooding.

The maximum load capacity of the hauling machine is normally configured to withstand the maximum possible load exerted by the pipeline on the rope, plus a certain margin of safety. Flooding of the pipeline is extremely rare, but cannot be predicted or prevented beforehand. The pipeline, for example, may flood as a result of cracks produced in the pipeline wall by excessive bending of the pipeline in critical water conditions, so the maximum load capacity of the hauling machine must also take this possibility into account, with the result that the hauling machine is grossly oversized for NR operations carried out in normal conditions.

PCT Patent Application No. WO 2006/027189 describes a method which employs gripping assemblies for gripping either the pipeline or the rope connected to the pipeline. Such assemblies, however, are normally only used on J-lay vessels (i.e., for launching the pipeline substantially vertically), and, because they operate discontinuously, may result in uncontrolled slippage of the rope.

A need is therefore felt to enable any type of laying vessel to handle emergency situations when abandoning and recovering the pipeline.

SUMMARY

The present disclosure relates to a pipeline abandon and recover ("A/R") method. More specifically, the present disclosure relates to a pipeline NR method using a laying vessel.

According to the present disclosure, there is provided a pipeline NR method using a rope connected to the pipeline, the method comprising the steps of winding/unwinding the rope utilizing a hauling machine to exert pull on the rope; adapting a crawler pipeline tensioning device to grip the rope; and exerting additional pull on a portion of rope between the crawler tensioning device and the pipeline.

By simply adapting the crawler pipeline tensioning device, the crawler tensioning device can be used to perform an auxiliary function, when abandoning/recovering the pipeline, to handle emergency situations or simply improve safety. Given the contribution of the crawler tensioning device, the power of the hauling machine may be selected, thus enabling considerable saving; and the contribution of the crawler tensioning device may be increased considerably by equipping the laying vessel with a number or quantity of crawler tensioning devices in series.

It is thus an advantage of the present disclosure to provide a straightforward, relatively low-cost method configured to handle emergency situations when abandoning and recovering the pipeline.

The method of one embodiment of the present disclosure provides for moving the crawler tracks along respective endless trajectories on the basis of the winding/unwinding speed of the rope.

Coordinating operation of the hauling machine and the crawler tensioning device provides for adequate force distribution.

More specifically, the method provides for controlling the hauling machine and the crawler tensioning device on the basis of pull and additional pull.

So doing prevents jerking which may result in slip of the rope retained by the crawler tensioning device.

More specifically, the step of adapting the crawler tensioning device comprises looping two adapters respectively about two tracks of the crawler tensioning device on opposite sides of the rope.

More specifically, each track is shaped to mate with the pipeline, and each adapter is shaped to mate with the track on one side, and with the rope on the other side.

By so doing, the crawler tensioning device operates in substantially the same way as when tensioning the pipeline.

Each adapter actually comprises a chain comprising a number or quantity of links, each of which is hinged to the adjacent links and comprises a convex inner face in the form of a cylindrical sector with a curvature similar to the curvature of the pipeline, and a concave outer face with a curvature similar to the curvature of the rope.

The present disclosure also relates to a straightforward, relatively low-cost A/R system configured to handle emergency situations when abandoning/recovering the pipeline.

According to the present disclosure, there is provided a pipeline A/R system using a rope connected to the pipeline, the system comprising a hauling machine configured to wind/unwind the rope and exerting pull on the rope; at least one crawler tensioning device configured to tension the pipeline as the pipeline is laid; and two adapters configured to adapt the crawler tensioning device to exert additional pull on a portion of rope between the crawler tensioning device and the pipeline.

A further advantage of the present disclosure is to provide an adapter configured to implement the method according to the disclosure relatively cheaply and relatively easily.

According to the present disclosure, there is provided an adapter configured to adapt a crawler tensioning device configured to tension a pipeline on a laying vessel, wherein the crawler tensioning device comprises two facing tracks configured to grip the pipeline and shaped to mate with the pipeline; and the adapter is shaped to mate with a respective track on one side, and with a rope on the other side.

The crawler tensioning device thus operates with the same geometric parameters as when tensioning the pipeline.

Additional features and advantages are described in, and will be apparent from the following Detailed Description and the figures.

BRIEF DESCRIPTION OF THE DRAWINGS

A non-limiting embodiment of the present disclosure will be described by way of example with reference to the accompanying drawings, in which:

FIGS. 1, 2, 3, and 4 show schematic side views, with parts removed for clarity, of a laying vessel at successive stages in abandoning a pipeline using the method according to the present disclosure;

FIG. 5 shows a larger-scale side view, with parts removed for clarity, of a crawler tensioning device on board the FIG. 1-4 laying vessel;

FIG. 6 shows a side view, with parts removed for clarity, of the FIG. 5 crawler tensioning device;

DETAILED DESCRIPTION

Figure 3:
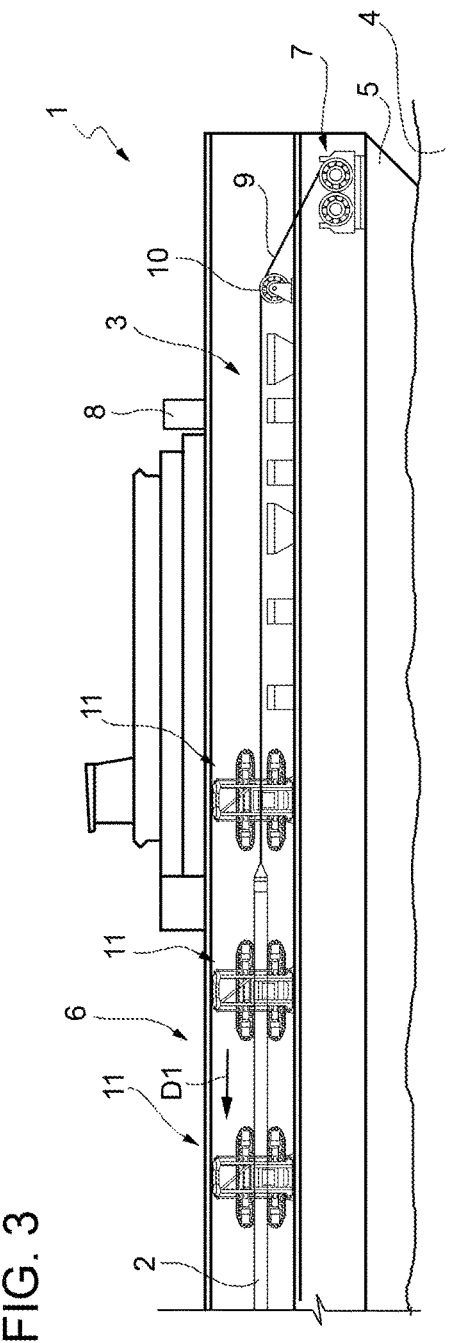

Referring now to the example embodiments of the present disclosure illustrated in FIGS. 1 to 8, number 1 in FIGS. 1 to 4 indicates as a whole a laying vessel configured to construct and lay a pipeline 2. The laying vessel in FIGS. 1 to 4 is an S-lay vessel and comprises a substantially horizontal assembly line 3. FIGS. 1 to 4 specifically show successive stages in abandoning pipeline 2 in controlled manner in a body of water 4—either because of bad weather or water conditions, or simply because pipeline 2 is completed—and during which the pipeline is fed in a direction D1. Laying vessel 1 comprises a floating structure 5; a conveyor line 6 configured to convey pipeline 2; a hauling machine 7 configured to carry out the abandon/recovery procedure; and a control unit 8 configured to control the abandon/recovery procedure. In the example shown, hauling machine 7 is a winch configured to wind/unwind a rope 9, which, during the abandon/recovery procedure, is fixed to the free end of pipeline 2 on board laying vessel 1, and, in FIGS. 1 to 4, is guided by a pulley 10 to align the rope with the portion of pipeline 2 on conveyor line 6. Laying vessel 1 also comprises three crawler tensioning devices 11 located in series along conveyor line 6 to grip pipeline 2 on opposite sides, and the number or quantity of which depends on the type of application, the linear weight of pipeline 2, and the depth of body of water 4.

Figure 4:
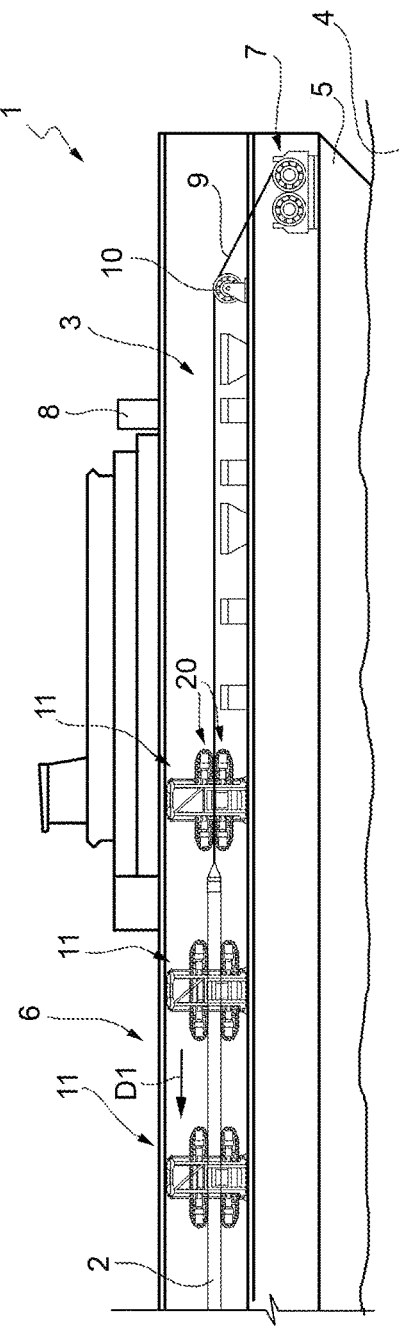

In FIG. 1, the three crawler tensioning devices 11 grip pipeline 2 simultaneously, and rope 9 connecting hauling machine 7 to pipeline 2 is slack, so the pull exerted by the weight of pipeline 2 immersed in body of water 4 is shared between the three crawler tensioning devices 11. Generally speaking, and as shown in FIG. 4, the load exerted by pipeline 2 is shared between the three crawler tensioning devices 11 and hauling machine 7. Load distribution is controlled by control unit 8, which is connected to hauling machine 7 and crawler tensioning devices 11 to determine the loads exerted by pipeline 2 and control the movements of hauling machine 7 and crawler tensioning devices 11.

As shown in FIGS. 5 and 6, each crawler tensioning device 11 comprises a frame 12; and two facing jaws 13 movable selectively in a direction D2 perpendicular to direction D1. Each jaw 13 is fitted to frame 12 to move in direction D2, and comprises four actuating assemblies 14 configured to move jaw 13 back and forth in direction D2; a supporting structure 15; a track 16 looped about supporting structure 15; and two power assemblies 17 configured to drive track 16 about supporting structure 15. As shown in FIG. 6, each track 16 comprises a number or quantity of saddles 18, each configured to mate with the outer face of pipeline 2, and each having elastomer inserts 19 configured to contact pipeline 2 and mate with pipelines within a designated or given range of diameters. Generally speaking, saddles 18 are supplied in different sizes, and are interchangeable, depending on the diameter of pipeline 2, to adapt tracks 16 to different pipeline diameters.

Number 20 in FIG. 6 indicates two adapters (shown by dash lines), each configured to loop about a respective track 16 to enable crawler tensioning device 11 to grip rope 9 (also shown by a dash line in FIG. 6).

Each track 16 is configured to mate with pipeline 2, and each adapter 20 is configured to mate with track 16 on one side, and with rope 9 on the other side.

Figure 7:
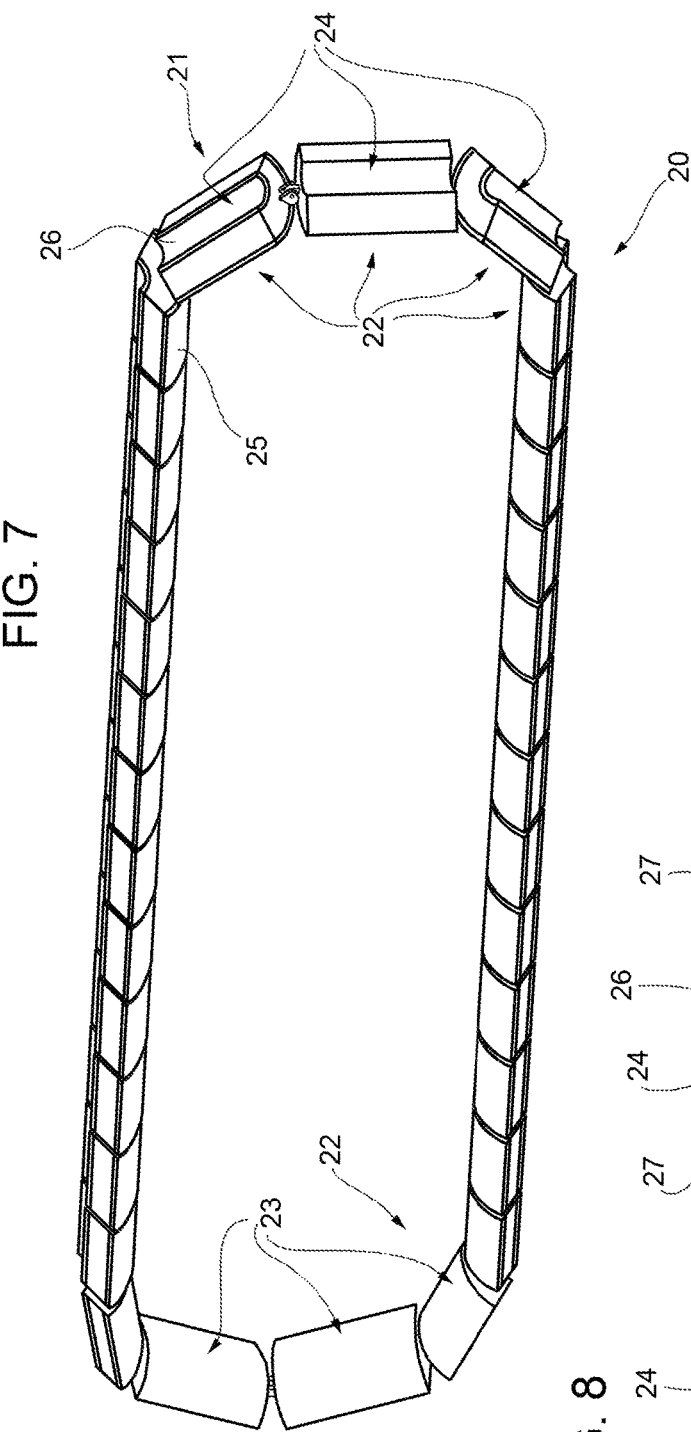
FIG. 7 shows a larger-scale view in perspective, with parts removed for clarity, of an adapter configured to fit onto the FIGS. 5 and 6 crawler tensioning device.
Figure 8:
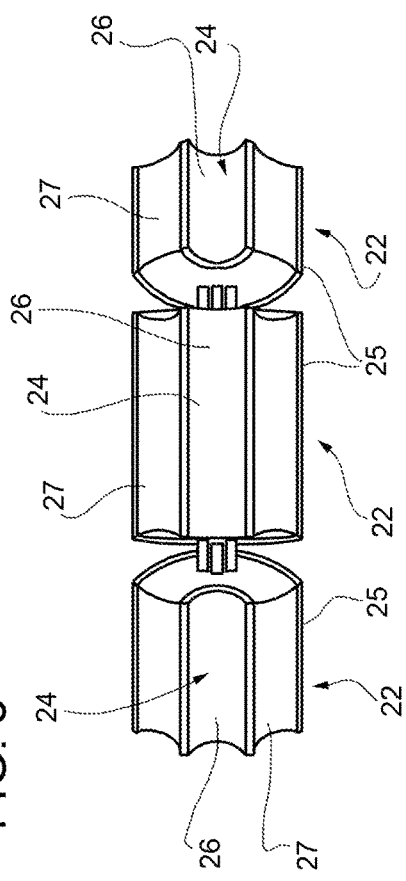
FIG. 8 shows a larger-scale plan view, with parts removed for clarity, of a detail of the FIG. 7 adapter.

As shown in FIG. 7, adapter 20 substantially comprises an endless chain 21 comprising a number or quantity of identical links 22.

Each link 22 is hinged to the adjacent links 22, is in the form of a cylindrical sector, and comprises a convex inner face 23 in the form of a cylindrical sector similar in curvature to pipeline 2 (FIG. 6); and a concave outer face 24 similar in curvature to rope 9 (FIG. 6). The terms 'inner' and 'outer' used in connection with adapter 20 refer to the position with respect to the loop formed by chain 21. Each link 22 also comprises a metal inner plate 25 defining convex inner face 23 and hinged to the adjacent metal inner plates 25 as shown more clearly in FIG. 8; a metal outer plate 26 defining concave outer face 24; and a block 27 of elastomer between inner metal plate 25 and outer metal plate 26.

With reference to FIGS. 2 and 3, as pipeline 2 moves gradually in direction D1, rope 9 is tensioned and part of the load exerted by pipeline 2 is absorbed by hauling machine 7. The crawler tensioning device 11 closest to rope 9 is detached from pipeline 2 and equipped with two adapters 20 to enable the crawler tensioning device to grip rope 9 and absorb part of the load exerted by pipeline 2. This operation can also be performed to adapt the other crawler tensioning devices 11 and achieve a pulling power on rope 9 capable of handling even exceptional accidental loads.

When recovering pipeline 2, the abandon operations described with reference to FIGS. 1 to 4 are performed in reverse order, and adapters 20 are removed from the crawler tensioning devices successively as pipeline 2 moves in the opposite direction to D1.

The FIG. 7 adapter 20 is assembled/disassembled by releasing two adjacent links 22 (FIG. 8) and looping/unlooping the adapter onto/off a track (FIG. 6).

Crawler tensioning devices 11 provide for exerting additional pull on rope 9, which, added to the pull of hauling machine 7, enables the load capacity of hauling machine 7 to be reduced with no reduction in safety margin or the ability to handle emergency situations such as flooding of pipeline 2.

Clearly, changes may be made to the embodiment described of the present disclosure without, however, departing from the scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of recovering a pipeline, said method comprising:
   winding a length of rope connected to the pipeline utilizing a hauling machine to exert pull on the length of rope;
   adapting a crawler pipeline tensioning device to grip the length of rope by looping, on opposite sides of the length of rope, two adapters, respectively, about two tracks of the crawler pipeline tensioning device, each adapter including a chain having a plurality of links which form a closed loop; and
   exerting additional pull on a portion of the length of rope using the adapted crawler pipeline tensioning device.

2. The method of claim 1, which includes moving a plurality of tracks of the crawler pipeline tensioning device along respective endless trajectories, said movement being based on a winding and unwinding speed of the length of rope.

3. The method of claim 1, which includes controlling the hauling machine and the crawler pipeline tensioning device.

4. The method of claim 1, wherein each of the links of each of the chains:
   is hinged to adjacent links,
   (ii) includes a convex inner face having a cylindrical sector with a curvature based on a curvature of the pipeline, and
   (iii) includes a concave outer face with a curvature based on a curvature of the length of rope.

5. The method of claim 4, wherein each link includes a metal inner plate defining the convex inner face which is hinged to the adjacent metal inner plates.

6. The method of claim 4, wherein each link includes a metal outer plate defining the concave outer face.

7. The method of claim 4, wherein each link includes: (i) a metal inner plate, (ii) a metal outer plate, and (iii) a elastomer block between the metal inner plate and the metal outer plate.

8. A method of recovering a pipeline, said method comprising:
   (a) winding a length of rope connected to the pipeline utilizing a hauling machine to exert pull on the length of rope;
   (b) adapting a crawler pipeline tensioning device to grip the length of rope by looping, on opposite sides of the length of rope, two adapters, respectively, about two tracks of the crawler pipeline tensioning device, wherein:
      (i) each track is shaped to mate with the pipeline,
      (ii) each adapter is shaped to mate with the track on one side of the adapter, and with the length of rope on another side of the adapter, and
      (iii) each adapter includes a chain having a plurality of links which form a closed loop; and
   (c) exerting additional pull on a portion of the length of rope using the adapted crawler pipeline tensioning device.

* * * * *